United States Patent
Siegwart

(10) Patent No.: US 7,409,574 B2
(45) Date of Patent: *Aug. 5, 2008

(54) MEASURING ELAPSED TIME FOR A SOFTWARE ROUTINE

(75) Inventor: David Kevin Siegwart, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/306,120

(22) Filed: Dec. 16, 2005

(65) Prior Publication Data

US 2006/0230323 A1    Oct. 12, 2006

(30) Foreign Application Priority Data

Dec. 22, 2004    (GB) ................... 0428038.4

(51) Int. Cl.
G06F 1/00 (2006.01)
G06F 1/04 (2006.01)
G06F 1/14 (2006.01)
G06F 11/00 (2006.01)

(52) U.S. Cl. .......... 713/502; 713/500; 713/503
(58) Field of Classification Search .......... 713/502
See application file for complete search history.

(56) References Cited

U.S. PATENT DOCUMENTS 7,188,052 B2 * 3/2007 Levine et al. .......... 702/187
2006/0229849 A1 * 10/2006 Levine et al. .......... 702/187

* cited by examiner

Primary Examiner—Thuan N. Du
Assistant Examiner—Michael J Brown
(74) Attorney, Agent, or Firm—Hamilton & Terrile

(57) ABSTRACT

A method for determining if a measurement of an elapsed time for an execution of a software routine in a computer system is valid. A clock skew is used between the clocks of two processors such that the size of the clock skew is greater than the maximum possible elapsed time for the execution of the software routine. The software routine is executed with a clock value recorded before (start time) and after (end time) execution. An elapsed time is calculated as a difference between the start time and the end time. Whether the elapsed time is valid is determined by checking for a positive value of the elapsed time and comparing the value of the elapsed time with the clock skew.

6 Claims, 2 Drawing Sheets

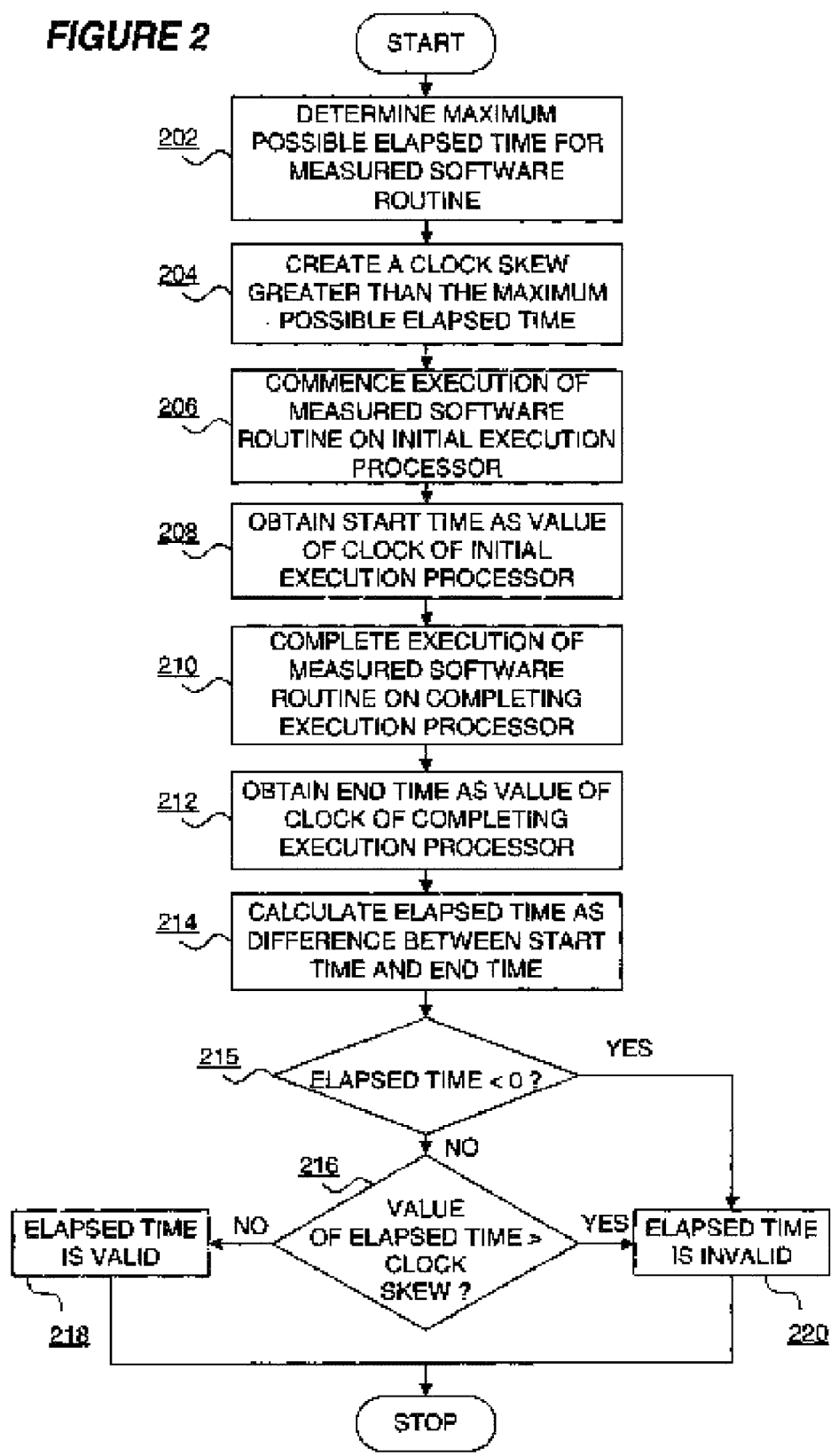

MEASURING ELAPSED TIME FOR A SOFTWARE ROUTINE

BACKGROUND OF THE INVENTION

The present invention relates to measuring an elapsed period of time for the execution of a software routine. More particularly it relates to identifying a valid measure of an elapsed period of time for the execution of a software routine in a multiprocessor system.

A computer central processing unit (CPU) may include a high frequency clock. For example, such a high frequency clock can define a step in a fetch, decode and execute cycle for the processor. Such clocks are to be distinguished from other system clocks which provide date and time facilities for a computer system since high frequency clocks are updated at a relatively high frequency. The precise frequency of such a high frequency clock is dependent upon the operational clock speed of a particular processor. By way of example, a processor configured to operate at a clock speed above one gigahertz will include a high frequency clock capable of providing a timing resolution of the order of magnitude of a nanosecond. This compares with a system clock which may provide a resolution of a thousandth or less of such high frequency clocks.

High frequency clocks in CPUs can be used to precisely measure elapsed time and therefore have useful applications in the measurement of performance statistics for computer programs executing in a processor. The high resolution of the clock allows the measurement of elapsed time for very short program fragments, such as fragments requiring only a few hundred processor cycles. A typical approach to such a measurement is illustrated in pseudo-code below:

```
start_time = getHighFrequencyClockTicks
<program fragment>
end_time = getHighFrequencyClockTicks
elapsed_time = end_time − start_time
```

The <program fragment> above is the program fragment for measurement. The pseudo-code "getHighFrequencyClockTicks" corresponds to processor instructions to obtain a value of the high frequency clock and is typically implemented as a few instructions in order to avoid consuming a significant amount of processor time. For example, in the Intel IA32 processor, "getHighFrequencyClockTicks" corresponds to the RDTSC (read time stamp counter) instruction.

Whilst the use of such high frequency clocks is advantageous for measuring elapsed time on a single processor, in a multiprocessor system problems can arise because it is not possible to guarantee that the clocks in each processor are synchronized in the sense that they express an identical clock time. The difference between a value of one processor clock and a value of another processor clock is termed clock skew. This characteristic of multiprocessor systems coupled with a possibility that a running program fragment can be switched between processors during execution makes it very difficult to accurately measure an elapsed time for a program. This arises because the start_time and end_time may be measured on different clocks in different CPUs. For example, the start_time may be measured on a clock in a processor on which the program fragment commenced execution, and the end_time may be measured on a clock in a processor on which the program fragment ceased execution. In this situation the elapsed time includes not only the time taken to execute the program fragment, but also the unwanted clock skew.

The clock skew may be anything from zero to billions of cycles. Such clock skew removes the validity of a measurement where two processors have clocks which are highly skewed (i.e. large difference between the clock values). Furthermore, where a clock skew between processors is small but the elapsed time of a program fragment is even smaller, the elapsed time as measured using the pseudo-code above may be negative. Since values of time in such high frequency clocks are often represented as unsigned data types, the measurement becomes meaningless. For example, the Intel IA32 processor stores the high frequency clock value as a sixty-four bit unsigned cycle value.

Various techniques have been used to address this problem with limited success. Some of these are outlined briefly below.

One possibility is to reset clocks before running the program fragment. This may improve the accuracy of measurements in the short term, but the value of clocks can diverge from each other (known as clock drift) causing increasing clock skew. Eventually, as clock skew increases above the elapsed time for a program fragment, invalid negative elapsed time measurements will occur.

An alternative approach is to measure the elapsed time on multiple occasions in order to generate a distribution of elapsed time measurements. Subsequently, those measurements which are outside a "normal" range (which can be defined using a statistical method) can be discarded, and a mean value of the distribution can be used as a statistical measure. This requires the additional overhead of generating and maintaining the distribution of measurements and may result in a less accurate mean measure.

A further alternative is to identify the processor on which the program fragment commences execution and to identify the processor on which the program fragment ceased execution. In this way it is possible to determine when the elapsed time measurement is based on clock values for the same processor. For example, the pseudo-code could be amended to:

```
start_processor = getProcessorID
start_time = getHighFrequencyClockTicks
<program fragment>
end_time = getHighFrequencyClockTicks
end_processor = getProcessorID
elapsed_time = end_time − start_time
if start_processor = end_processor then elapsed_time is valid
```

However, the instruction to obtain an identifier for a processor (nominally indicated as "getProcessorID") is typically a synchronising instruction which interferes with the measurement. Also, it is possible that the performance measurement program is switched to a different processor between the "getProcessorID" instruction and the "getHighFrequencyClockTicks" instruction. Consequently, the "getHighFrequencyClockTicks" instruction will obtain a clock value for a processor which is different to the processor identified by the "getProcessorID" instruction.

Thus it would be advantageous to provide a mechanism for identifying accurate and valid measurements of elapsed time for a program fragment in a multiprocessor system.

SUMMARY OF THE INVENTION

The present invention accordingly provides, in a first aspect, a method for determining if a measurement of an elapsed time for an execution of a software routine in a computer system is valid, the software routine having a maximum elapsed time, and the computer system including a first processor and a second processor, each of the first and second processors including a clock, wherein the clocks are skewed by an amount greater than the maximum elapsed time, the method comprising the steps of: commencing execution of the software routine on an initial execution processor, the initial execution processor being one of the first or second processors; obtaining a start time as a value of the clock of the initial execution processor; completing execution of the software routine on a completing execution processor, the completing execution processor being one of the first or second processors; obtaining an end time as a value of the clock of the completing execution processor; calculating an elapsed time as a difference between the start time and the end time; determining whether the elapsed time is valid by checking for a positive value of the elapsed time and comparing the value of the elapsed time with the clock skew. Thus, in this way the method is able to measure an elapsed time for the execution of the software routine. Further, the method is able to identify situations where the software routine has definitely been redispatched to a different CPU during execution by comparing the measured elapsed time to the clock skew, and thus whether a measured elapsed time is a valid elapsed time. The identification of whether the software routine has been redispatched to a different CPU during execution can be made because the elapsed time will only be greater than the clock skew if the initial execution processor is different to the completing execution processor. I.e. if the two execution processors are the same the elapsed time would not be greater than the maximum elapsed time, and hence not greater than the clock skew.

The present invention accordingly provides, in a second aspect, a method for determining if a measurement of an elapsed time for an execution of a software routine in a computer system is valid, the software routine having a maximum elapsed time, and the computer system including a first processor and a second processor, each of the first and second processors including a clock, the method comprising the steps of: modifying a value of the clock of the second processor so that a difference between a value of the clock of the first processor and the value of the clock of the second processor is larger than the maximum elapsed time, the difference between the value of the clock of the first processor and the value of the clock of the second processor being a clock skew; commencing execution of the software routine on an initial execution processor, the initial execution processor being one of the first or second processors; obtaining a start time as a value of the clock of the initial execution processor; completing execution of the software routine on a completing execution processor, the completing execution processor being one of the first or second processors; obtaining an end time as a value of the clock of the completing execution processor; calculating an elapsed time as a difference between the start time and the end time; determining whether the elapsed time is valid by checking for a positive value of the elapsed time and comparing the value of the elapsed time with the clock skew.

The present invention accordingly provides, in a third aspect, an apparatus for determining if a measurement of an elapsed time for an execution of a software routine in a computer system is valid, the software routine having a maximum elapsed time, and the computer system including a first processor and a second processor, each of the first and second processors including a clock, wherein the clocks are skewed by an amount greater than the maximum elapsed time, the apparatus comprising: means for commencing execution of the software routine on an initial execution processor, the initial execution processor being one of the first or second processors; means for obtaining a start time as a value of the clock of the initial execution processor; means for completing execution of the software routine on a completing execution processor, the completing execution processor being one of the first or second processors; means for obtaining an end time as a value of the clock of the completing execution processor; means for calculating an elapsed time as a difference between the start time and the end time; means for determining whether the elapsed time is valid by checking for a positive value of the elapsed time and comparing the value of the elapsed time with the clock skew.

The present invention accordingly provides, in a fourth aspect, an apparatus for determining if a measurement of an elapsed time for an execution of a software routine in a computer system is valid, the software routine having a maximum elapsed time, and the computer system including a first processor and a second processor, each of the first and second processors including a clock, the apparatus comprising: means for modifying a value of the clock of the second processor so that a difference between a value of the clock of the first processor and the value of the clock of the second processor is larger than the maximum elapsed time, the difference between the value of the clock of the first processor and the value of the clock of the second processor being a clock skew; means for commencing execution of the software routine on an initial execution processor, the initial execution processor being one of the first or second processors; means for obtaining a start time as a value of the clock of the initial execution processor; means for completing execution of the software routine on a completing execution processor, the completing execution processor being one of the first or second processors; means for obtaining an end time as a value of the clock of the completing execution processor; means for calculating an elapsed time as a difference between the start time and the end time; means for determining whether the elapsed time is valid by checking for a positive value of the elapsed time and comparing the value of the elapsed time with the clock skew.

The present invention accordingly provides, in a fifth aspect, computer program products comprising computer program code stored on a computer readable storage medium which, when executed on a data processing system, instructs the data processing system to carry out the methods described above.

BRIEF DESCRIPTION OF THE DRAWINGS

A preferred embodiment of the present invention will now be described, by way of example only, with reference to the accompanying drawings, in which:

FIG. 2 is a flowchart illustrating a method of the measurer software routine of FIG. 1 in accordance with a preferred embodiment of the present invention.

DETAILED DESCRIPTION OF THE PREFERRED EMBODIMENTS

Figure 1:
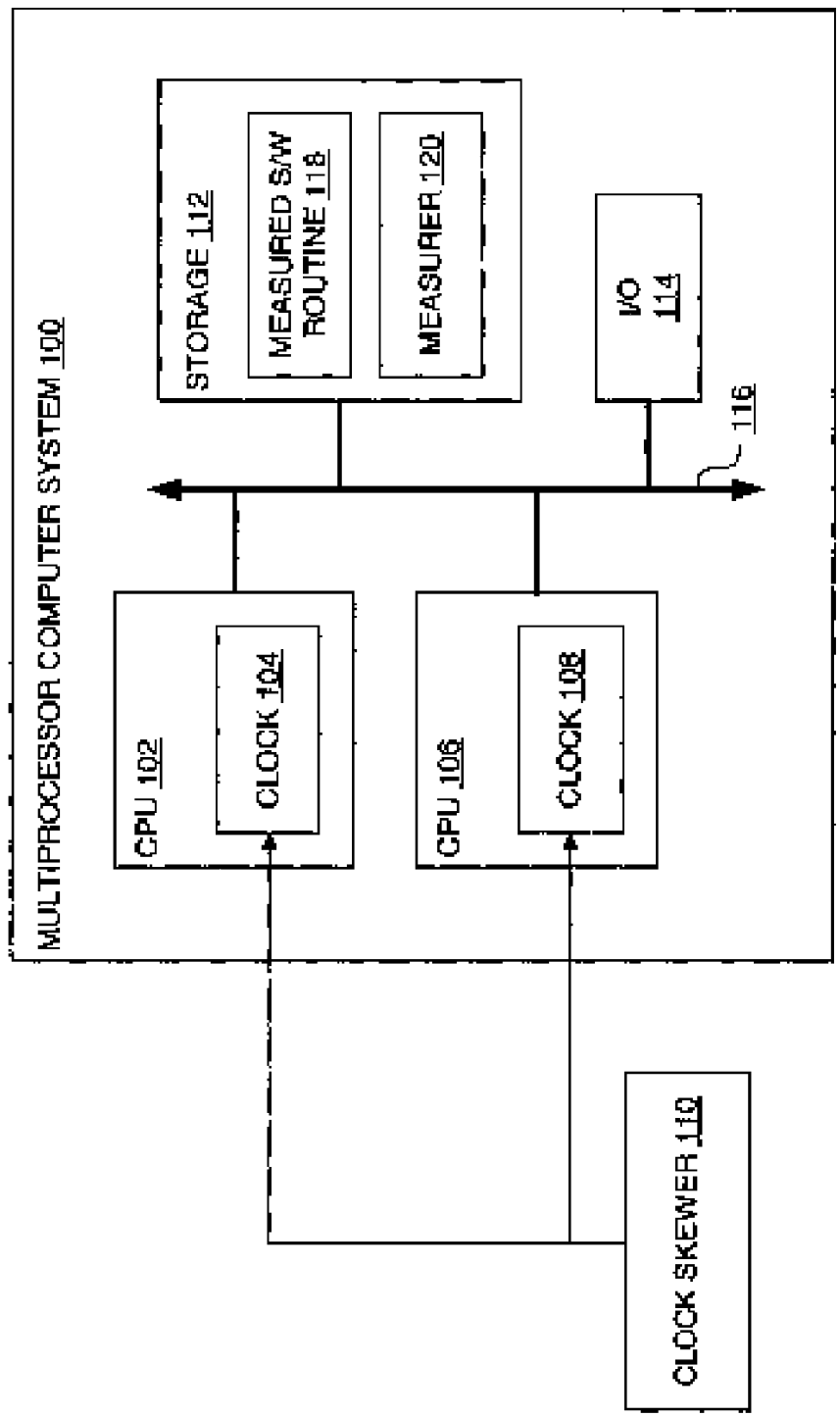
FIG. 1 is a block diagram of a multiprocessor computer system (MPC) including two CPUs and in accordance with a preferred embodiment of the present invention.

FIG. 1 is a block diagram of a multiprocessor computer system (MPC) 100 including two CPUs 102 and 106 in accordance with a preferred embodiment of the present invention. Each of the CPUs 102 and 106 includes a clock 104 and 108. Clocks 104 and 108 are high frequency clocks internal to the CPUs. For example, the CPUs 102 and 106 are Intel IA32 CPUs such as Intel Pentium and the clocks 104 and 108 are sixty-four bit unsigned clock values updated regularly, such as every nanosecond. The MPC 100 further includes storage 112 which can be any read/write storage device such as a random access memory (RAM) or a non-volatile storage device. An example of a non-volatile storage device includes a disk or tape storage device. Storage 112 includes a measured software routine 118 and a measurer software routine 120 which are software routines for execution in the CPUs 102 and 106 and are considered in detail below. The MPC 100 also includes an input/output (I/O) interface 114 which is an interface to devices for the input or output of data, or for both input and output of data. Examples of I/O devices connectable to I/O interface 114 include a keyboard, a mouse, a display (such as a monitor) and a network connection. The CPUs 102 and 106 are communicatively connected to storage 112 and I/O interface 114 via a data bus 116.

In use, the MPC 100 executes software routines including operating system software, application software, the measured software routine 118 and the measurer software routine 120 in one or both of the CPUs 102 and 104. Software routines are stored in storage 112 and transferred between the storage 112 and the CPUs 102 and 104 via the data bus 116. Rules of operation regarding the use of the CPUs 102 and 104 (such as which software routines run on which CPU) are decided by operating logic (not shown) of the MPC 100 such as a software operating system or a firmware operating subsystem, as is well known in the art.

FIG. 1 further includes a clock skewer 110. The clock skewer 110 is a hardware or software component capable of introducing a skew between values of the clocks 104 and 108. A clock skew is the magnitude of a difference between the values of two clocks where the clocks are measured synchronously. For example, if clocks 104 and 108 were read synchronously at a particular instant and clock 104 had a value of "10" clock units, whilst clock 108 had a value of "12" clock units, there would be a skew of "2" clock units. The actual difference between the value of two clocks can be positive of negative depending upon which clock value is subtracted from which other clock value, thus: "10-12=-2" or "12-10=2". Herein, clock skew shall be taken to mean only the positive valued skews, and if we wish to speak about negative skews, we will call this negative clock skew. Hence by clock skew is meant the magnitude of the difference between values of two clocks. The clock skewer 110 is illustrated as being outside the MPC 100. Alternatively, the clock skewer 110 can form part of the MPC 100, such as a software routine stored in storage 112 or a hardware component connected to the bus 116.

The measurer software routine 120 is a software routine for measuring a period of time elapsed during the execution of the measured software routine 118. The actual content of the measured software routine 118 is immaterial to this description since the measured software routine 118 can be any software routine howsoever simple or complex. Whilst the measurer software routine 120 is illustrated as being stored in storage 112, the measurer software routine 120 could alternatively be stored as firmware communicatively connected to the bus 116 of the MPC 100. In a further alternative, the measurer software routine 120 could be stored remotely on a different computer system communicatively connected to the MPC 100, such as through the I/O interface 114. Methods of the measurer software routine 120 will now be considered in detail with respect to FIG. 2 below.

FIG. 2 is a flowchart illustrating a method of the measurer software routine 120 of FIG. 1 in accordance with a preferred embodiment of the present invention. At step 202, the measurer software routine 120 determines a maximum elapsed time for the execution of the measured software routine 118. This determination may be based on previous execution of the measured software routine 118 (such as an elapsed time for the execution of the measured software routine 118 on a single processor computer system). Alternatively, if no previous measurements of the elapsed time are known, a extreme value of the maximum elapsed time for the measured software routine 118 can be used. For example, a value corresponding to a period of time which will far exceed the anticipated time taken to execute the measured software routine 118. Thus the maximum elapsed time depends on the measured software routine 118, and may range from one hour or less to one year or more.

At step 204 the measurer software routine 120 creates a clock skew between the clocks 104 and 108. The size of the skew is greater than the maximum elapsed time determined at step 202. To achieve this clock skew the measurer software routine 120 uses the clock skewer 110. One way the clock skewer 110 can implement a clock skew is to set the values of one or both of the clocks 104 and 108 directly. However, in some computer architectures whilst it is possible to reset a clock value (such as by setting the clock value to zero), it may not be possible to change a processor clock directly. For example, in the Intel IA32 CPU it is not possible to amend the top thirty-two bits of the sixty-four bit clock field. In such circumstances the clock skewer 110 can reset the value of one clock before waiting a period of time corresponding to the maximum elapsed time. Once this period has passed the clock skewer 110 can reset the value of the other clock. In this way the clock skewer 110 can create a clock skew between the two clocks 104 and 108.

At step 206 the measurer software routine 120 commences the execution of the measured software routine 118 on an initial execution processor. The initial execution processor is one of the CPUs 102 or 106 on which the measured software routine 118 initially executes. Since a determination of which CPU is used by the MPC 100 to execute a software routine is left to the operating logic of the MPC 100 (such as the operating system), the measurer software routine 120 cannot be sure which of the two CPUs 102 or 106 will be the initial execution processor. At step 208 a start time is read as a value of the clock of the initial execution processor. Thus, if the measured software routine 118 initially executes on CPU 102, then a value of the clock 104 of CPU 102 is read as the start time at step 208.

At step 210 the measured software routine 118 completes execution on a completing execution processor. The completing execution processor is one of the CPUs 102 or 106 on which the measured software routine 118 is executing when it completes (i.e. when it terminates). It is to be appreciated that since the measured software routine 118 is executing on a multiprocessor computing system, the completing execution processor may be different to the initial execution processor. This is because the operating logic of the MPC 100 may redispatch the measured software routine 118 at runtime to a different CPU. For example, the measured software routine 118 may commence execution on CPU 102 and may complete execution on CPU 106.

At step 212 an end time is read as a value of the clock of the completing execution processor. Thus, if the measured software routine 118 completes execution on CPU 102, then a value of the clock 104 of CPU 102 is read as the end time at step 212. Subsequently, at step 214 an elapsed time is calculated as the difference between the start time and the end time. At step 215 the method determines if a value of the elapsed time is negative. If step 215 determines that the value of the elapsed time is negative (i.e. less than zero) then the method proceed to step 220 where an indication may be generated that the elapsed time calculated at step 214 is invalid. This determination can be made because a negative value of elapsed time must result in a change of CPU during the execution of the measured software routine 118 because the end time must be earlier than the start time. If there was no change of CPU then the end time would be larger than the start time due to the use of the same, incrementing, clock.

At step 216 the method determines if an value of the elapsed time is greater than the size of the clock skew introduced at step 204. If step 216 determines that the value of the elapsed time is greater than the size of the clock skew then the method proceed to step 220 where an indication may be generated that the elapsed time calculated at step 214 is invalid. This determination can be made because the clock skew introduced at step 220 corresponds to a value which is greater than the maximum elapsed time for execution of the measured software routine 118. Consequently, if the elapsed time is greater than the size of this clock skew then the measured software routine 118 will have been redispatched to a different CPU by the operating logic of the MPC 100 during execution. That is to say that if the elapsed time is greater than the size of this clock skew then the initial execution processor is not the same as the completing execution processor. Consequently, it can be determined that the measure of the elapsed time for the execution of the measured software routine 118 is invalid.

Alternatively, if step 216 determines that the value of the elapsed time is not greater than the size of the clock skew then the method proceeds to step 218 where an indication may be generated that the elapsed time calculated at step 214 is valid. If the elapsed time is less than the size of the clock skew introduced at step 220 then the method is able to determine that the measured software routine 118 was not redispatched to a different CPU by the operating logic of the MPC 100 during execution. That is to say that the initial execution processor is the same as the completing execution processor. If the measured software routine 118 was redispatched to a different CPU during execution the elapsed time would include the clock skew introduced at step 204 and would consequently be greater than the clock skew.

In this way the measurer software routine 120 is able to measure an elapsed time for the execution of the measured software routine 118. Further, the measurer software routine 120 is able to identify whether the measured software routine 118 was redispatched to a differed CPU during execution, and thus whether a measured elapsed time is a valid elapsed time.

What is claimed is:

1. A method for determining if a measurement of an elapsed time for an execution of a software routine in a computer system is valid, the software routine having a maximum elapsed time, the computer system including a first processor and a second processor, each of the first and second processors including a clock, the method comprising the steps of:

modifying a value of the clock of the second processor so that a difference between a value of the clock of the first processor and the value of the clock of the second processor is larger than the maximum elapsed time, the difference between the value of the clock of the first processor and the value of the clock of the second processor being a clock skew;

commencing execution of the software routine on an initial execution processor, the initial execution processor being one of the first or second processors;

obtaining a start time as a value of the clock of the initial execution processor;

completing execution of the software routine on a completing execution processor, the completing execution processor being one of the first or second processors;

obtaining an end time as a value of the clock of the completing execution processor;

calculating an elapsed time as a difference between the start time and the end time;

determining whether the elapsed time is valid by checking for a positive value of the elapsed time and comparing the value of the elapsed time with the clock skew.

2. The method of claim 1, wherein the step of modifying a value of the clock of the second processor further comprises setting the value of the clock of the second processor to a zero value.

3. A computer-usable medium embodying computer program code, the computer program code for determining if a measurement of the execution time of a software routine is valid, wherein the software routine comprises a maximum elapsed time, the computer program code suitable for use in a computer system comprising first and second processors wherein each processor comprises a clock, the difference between the value of the clock of the first processor and the value of the clock of the second processor being a clock skew, the computer program code comprising computer executable instructions configured to:

modify a value of the clock of the second processor so that the clock skew is larger than the maximum elapsed time;

commence execution of the software routine on an initial execution processor, the initial execution processor being one of the first or second processors;

obtain a start time as a value of the clock of the initial execution processor;

complete execution of the software routine on a completing execution processor, the completing execution processor being one of the first or second processors;

obtain an end time as a value of the clock of the completing execution processor;

calculate an elapsed time as a difference between the start time and the end time;

determine whether the elapsed time is valid by checking for a positive value of the elapsed time and comparing the elapsed time with the clock skew.

4. The computer-usable medium of claim 3, wherein the computer executable instructions configured to modify a value of the clock of the second processor further comprises computer executable instructions configured to set the value of the clock of the second processor to a zero value.

5. An apparatus for determining if a measurement of an elapsed time for an execution of a software routine in a computer system is valid, the software routine having a maximum elapsed time, and the computer system including a first processor and a second processor, each of the first and second processors including a clock, the apparatus comprising:

means for modifying a value of the clock of the second processor so that a difference between a value of the clock of the first processor and the value of the clock of the second processor is larger than the maximum elapsed time, the difference between the value of the clock of the first processor and the value of the clock of the second processor being a clock skew;

means for commencing execution of the software routine on an initial execution processor, the initial execution processor being one of the first or second processors;

means for obtaining a start time as a value of the clock of the initial execution processor;

means for completing execution of the software routine on a completing execution processor, the completing execution processor being one of the first or second processors;

means for obtaining an end time as a value of the clock of the completing execution processor;

means for calculating an elapsed time as a difference between the start time and the end time;

means for determining whether the elapsed time is valid by checking for a positive value of the elapsed time and comparing the value of the elapsed time with the clock skew.

6. The apparatus of claim 5 wherein the means for modifying a value of the clock of the second processor further comprises means for setting the value of the clock of the second processor to a zero value.

\* \* \* \* \*